RICHARD RALPH À COURT BEADON.
ELASTIC TIRE FOR WHEELS OF VEHICLES.
APPLICATION FILED JULY 12, 1920.
1,398,169.
Patented Nov. 22, 1921.
3 SHEETS—SHEET 1.
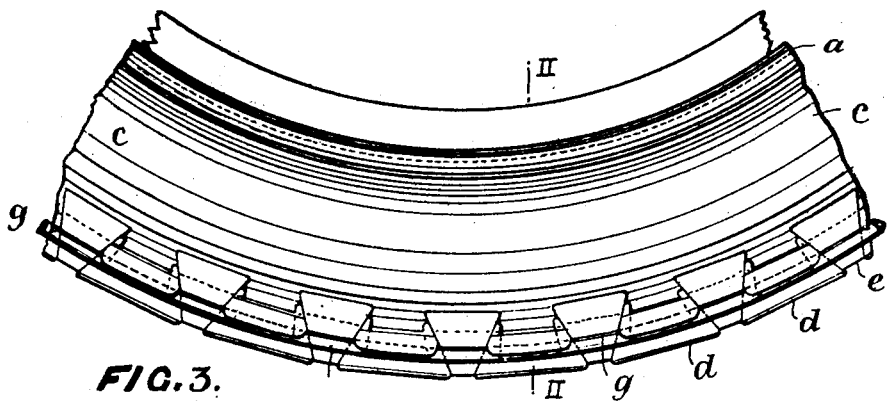
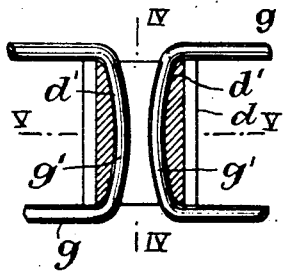
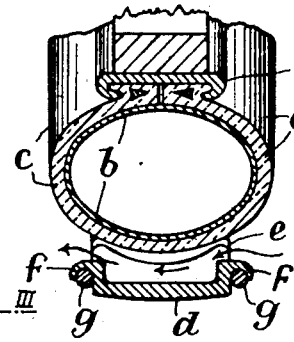
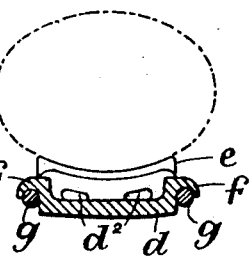
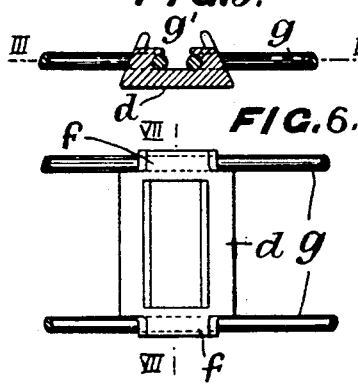
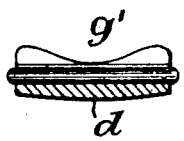

RICHARD RALPH À COURT BEADON.
ELASTIC TIRE FOR WHEELS OF VEHICLES.
APPLICATION FILED JULY 12, 1920.

1,398,169.

Patented Nov. 22, 1921.
3 SHEETS—SHEET 2.

RICHARD RALPH À COURT BEADON.
ELASTIC TIRE FOR WHEELS OF VEHICLES.
APPLICATION FILED JULY 12, 1920.

1,398,169.

Patented Nov. 22, 1921.
3 SHEETS—SHEET 3.

UNITED STATES PATENT OFFICE.

RICHARD RALPH À COURT BEADON, OF AGRA, INDIA.

ELASTIC TIRE FOR WHEELS OF VEHICLES.

1,398,169.  Specification of Letters Patent.  Patented Nov. 22, 1921.

Application filed July 12, 1920. Serial No. 395,510.

*To all whom it may concern:*

Be it known that I, RICHARD RALPH À COURT BEADON, a subject of the King of Great Britain, residing at Dufferin Hospitals, Agra, United Provinces, India, have invented certain new and useful Improvements in and Connected with Elastic Tires for Wheels of Vehicles, of which the following is a specification.

This invention relates to improvements in and connected with elastic tires for wheels of vehicles and has for its principal object to provide an improved resilient wheel tire comprising an armored endless track tread which may be of considerable breadth, and capable, at high speed, of absorbing shocks due to irregularities in the surface of the road and of storing up energy for restitution. At the same time the invention seeks to lessen the cross strains in the outer cover of the pneumatic tire and to reduce considerably the present necessary stiffness of the said outer cover, thus economizing energy which, at present, is wasted in generating heat at the cost of petrol and to the detriment of the tire, the said heat being due to the bending and unbending of the tire. A further object is to provide a combination of separate rubber and metal voussoirs or tread blocks for the tread, the presence of the metal being calculated to prevent skidding and side slipping, thus insuring a good grip on the road.

According to this invention the improved tread is made up of any convenient number of separate voussoirs, tread blocks or segments made of resilient and non-resilient material such as rubber and metal, the resilient or rubber blocks alternating with the non-resilient or metal blocks. The efficiency of the working of the tread is increased by increasing the number of the tread blocks or voussoirs owing to the reduced relative motion and mass of the parts, and the reduction of their radius of gyration. The increased number of parts is limited by the surface area available for air cooling. It is advantageous to use not less than 72 voussoirs in the tread of the driving wheel of a motor car.

The non-resilient voussoirs or tread blocks can be made of various metals or alloys. For instance, they can be made of spring steel, or rustless nickel steel alloy, or of aluminium zinc alloy already proved so useful in aeroplane work, which, weight for weight, may be 2½ times as strong as steel.

The thread is held on and controlled by a flexible tension member which consists of a cable permanently joined to form a single ring and then flattened to form a loop, each end of the loop being connected to a key block or voussoir. The alternate rubber and metal voussoirs are placed in position between the two convolutions of the loop, the metal voussoirs being provided with lips on each side for engagement with the said convolutions. The rubber voussoirs are held in initial compression between the walls of the alternate metal voussoirs. As the tread takes the load or shock it is deformed from a circular shape to a shape comprising two distinct semi-elliptical curves which vary according to the degree of flexibility consequent on the number of voussoirs employed. The motion of the voussoirs enables them to conform to the irregularities in the surface of the ground and to take the shocks, under the control of the tension member and the elastic support of the pneumatic tire, the latter being held in the grip of the rubber voussoirs or tread blocks. With this construction and arrangement, movement of the tire in a lateral direction, or perpendicular to the plane of the wheel is prevented. During the oscillation and radial reciprocation of the voussoirs or tread blocks, not only is the elastic support of the pneumatic tire brought into action, but also the elastic resistance of the rubber voussoirs. The metal voussoirs are free, within certain limits, to move angularly about their axes and the rubber voussoirs accommodate themselves in such a manner that the lower surfaces of a number of voussoirs can come into even contact with the road. By the employment of the loop tension member or cable, the voussoirs or tread blocks may be held in initial compression before the pneumatic tire is inflated.

In order to enable the invention to be readily understood, reference is made to the accompanying drawings, in which:—

Figure 1 is a side elevation of a portion of a pneumatic tire fitted with an endless track or tread constructed and arranged in accordance with these improvements.

Fig. 2 is a cross section, on the line II—II of Fig. 1.

Fig. 3 is a plan section taken on the line III—III of Fig. 5, of a so-called key tread block or voussoir.

Fig. 4 is a transverse section on the line IV—IV of Fig. 3.

Fig. 5 is a section taken on the line V—V of Fig. 3.

Fig. 6 is an inverted plan of one of the metal tread blocks or voussoirs.

Fig. 7 is a transverse section on the line VII—VII of Fig. 6.

Fig. 8 is an end elevation of a rubber tread block or voussoir.

Figure 9:
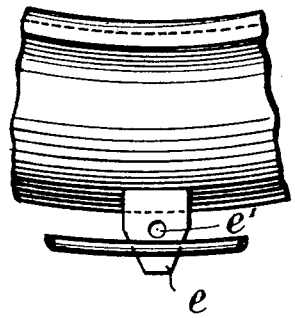
Fig. 9 is a side elevation showing a rubber tread block in initial compression on a pneumatic tire.

In the drawings, $a$ is a wheel rim of any suitable construction and $b$ is an inner tube of a pneumatic tire inclosed in an outer cover $c$ of suitable construction and fastened on to the rim $a$ by any convenient means. Around the outer cover $c$ is arranged the endless series of tread blocks; the series being composed of alternated metal tread blocks $d$, and rubber tread blocks $e$. As will be seen from Fig. 1, the tread blocks are of wedged or keystone shape as seen from the side of the tire and the wide sides of the metal blocks $d$ are presented toward the road to form the tread whereas the wide sides of the rubber blocks $e$ are presented toward the pneumatic tire upon which they take a bearing. Each metal block $d$ (with the exception of a key block hereinafter described) is formed at each side with a lip or projection $f$ formed for seating a tension member or cable $g$ which is employed for retaining the tread blocks in position around the tire. A steel wire cable is suitable for the purpose, but cables of other material such as copper, or a suitable alloy may be used, or the tension member may be a chain, or a flexible woven metal band or the like.

Figure 10:
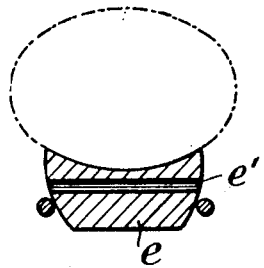
Fig. 10 is a transverse section of Fig. 9.
Figure 11:
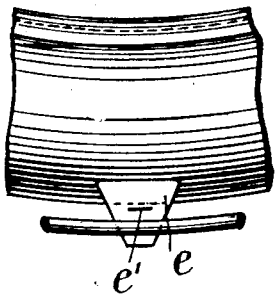
Fig. 11 is a view similar to Fig. 9, but showing the rubber tread block under compression due to the load.
Figure 12:
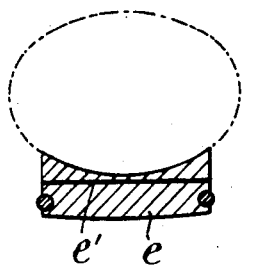
Fig. 12 is a transverse section of Fig. 11.

When using such cable, chain, or band, a circle is formed by permanently joining the ends of a length of tension member and then folding one semi-circle on the other the two semi-circles being joined by looped parts $g'$, $g'$, Fig. 3, which are brought together so that a double circle is formed. One of the metal tread blocks, called the key block, is formed with transverse seatings $d'$ $d'$, Fig. 3, for engaging with the looped ends of parts $g'$ $g'$ of the cable $g$. Before the manufacturer permanently joins the tension member into a ring, he will have stretched the material to meet the strain it will be called upon to undergo with the necessary factor of safety. Should any slackening in the cable's relation to the tread blocks take place, due either to the wear of the rubber voussoirs or other unforeseen cause, such slackening will be automatically adjusted, by the further radial penetration of the rubber voussoirs in relation to their counter metal wedges, on inflation of the pneumatic tire. In case the rubber voussoirs become too worn for this means of adjustment, one extra wedge of wood, metal or rubber can be sandwiched between any one of the voussoirs, since by the increase in thickness of any single voussoir, the proper tension of the cable is insured. An important advantage of using a single permanently joined looped cable as above described and illustrated, instead of two separate tension members, lies in the fact that, any strain at one point of the cable is automatically adjusted at every other point of the cable, while the permanent joint possesses the greatest mechanical simplicity. In assembling the tread therefore, and before the pneumatic tire is inserted, the looped ends $g'$ $g'$ are engaged with the seatings $d'$ $d'$ of the key block and the alternate rubber and metal blocks are then placed in position around the tread, the lips $f$ of the metal blocks being engaged with the two rings of the cable, as will be readily understood from the drawing. The last rubber block will be driven home with a mallet or other suitable means of pressure, so that the tread is completely keyed up, its voussoirs being placed under slight circumferential initial compression sufficiently only to meet the restraint of the tension cable. Thus the whole tread composed of voussoirs and cable, becomes one compact resilient body. The outer cover with its inner pneumatic tube and valve are now placed in position within the groove provided by the wide sides of the rubber blocks, the metal blocks seating against the inclined sides of the adjacent rubber blocks. The beading of the outer tire of the pneumatic tube is then pressed into the grooves of the wheel's rim as in the ordinary case of pneumatic tires, after which the tire is inflated, thereby forcing each rubber voussoir into further initial compression amounting to what may be found convenient by trial and error. In the accompanying drawings three eighths of an inch radial initial compression has been allowed for, while the pneumatic tire owing to its elliptical formation in cross section is under ½ inch (it might be more or less) initial compression, relative to the space afforded by the major axis of the ellipse when the tread takes up this formation from its circular shape, on taking the load or shock. Owing to the compression of the rubber blocks in different directions, the precise initial shape of the rubber blocks may vary considerably, as will be readily understood. It is a matter of design to predetermine the most advantageous initial form for these blocks to suit any given condition. The bases of the metal blocks may be flat, in order to get a flat tread on soft ground, but they could be made curved if preferred. As will be seen from Figs. 6 and 7, the metal blocks $d$ are made hollow or of trough shape and may be formed with slots $d^2$ in the end walls which bear against the rubber blocks. The side walls do not support the pneumatic tire, thus offering space designed so as to enable air to pass through from one side of the wheel to the other for cooling purposes as indicated by the arrows in Fig. 2, while the slots in the end walls not only permit air to have contact with the rubber blocks for cooling but also afford a better grip for the rubber voussoirs. The rubber tread blocks $e$ may be formed with a perforation $e'$ as seen in Fig. 8, which figure illustrates one suitable shape for these blocks before being applied to a wheel and placed under initial compression. When under initial compression, the the blocks may take the form illustrated in Figs. 9 and 10, and it will be noticed that it is arranged that this initial compression of the rubber does not close the hole $e'$. When a rubber block comes to the tread position and is under compression of the load, however, the further compression of the rubber does produce closure of the hole $e'$ as seen in Figs. 11 and 12. Upon the passing away of this block from the tread position, the hole $e'$ will reopen, and cool air will enter, so that the provision of these holes enables a very satisfactory and efficient ventilation and cooling of the rubber blocks to be effected.

Figure 13:
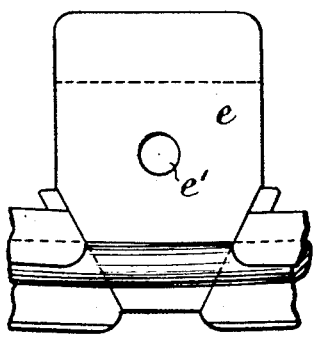
Fig. 13 is a side elevation to a larger scale than the preceding figures, illustrating a rubber tread block disposed between two metal tread blocks and before being placed in radial compression.
Figure 14:
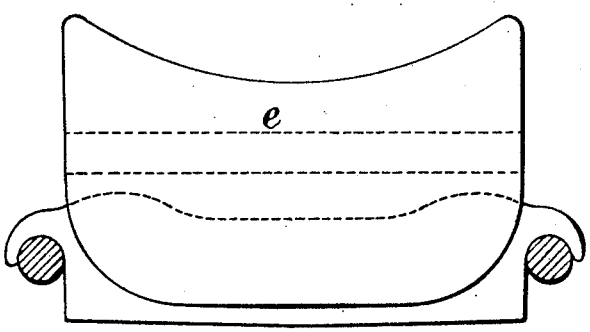
Fig. 14 is a view as seen from one side of Fig. 13.
Figure 15:
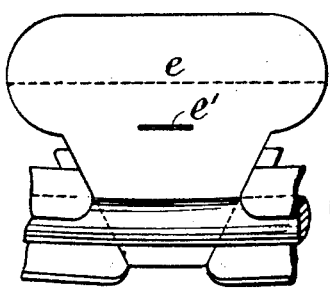
Fig. 15 is a view similar to Fig. 13, but showing the rubber block placed under three eighths of an inch radial compression.
Figure 16:
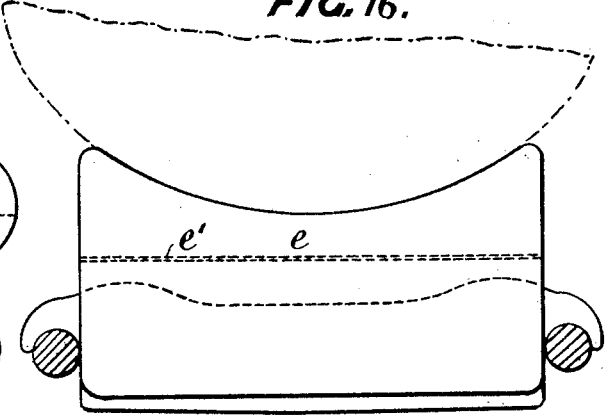
Fig. 16 is a view as seen from one side of Fig. 15.

Referring to Figs. 13 to 16, it will be seen that the concave seating head of the block $e$ in Figs. 13 and 14, is adapted to spread under the application of pressure by the inflated tire, and to acquire the shape somewhat as depicted in Fig. 15, thereby lengthening the seating surface in the circumferential direction.

Figure 17:
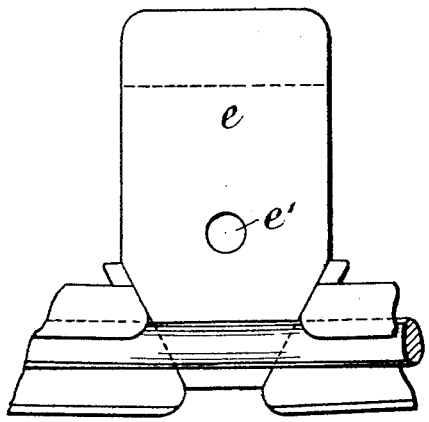
Fig. 17 is a view similar to Fig. 13 of a modified form of rubber block.
Figure 18:
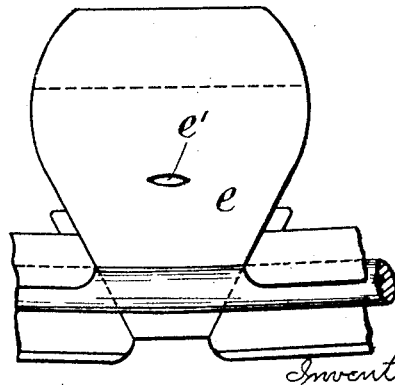
Fig. 18 is a similar view but showing the rubber block after being placed in three eighths of an inch radial compression.

Referring to Fig. 17, it will be seen that the rubber blocks may be given an appreciable radial length, so that when the block is compressed as shown in Fig. 18, the pneumatic tire is still an appreciable distance, as for example two inches, from the road surface, so that it is practically impossible for the pneumatic tire to be punctured. These deep rubber blocks may be regarded somewhat as diminutive spokes between the tread and the pneumatic tire and they afford greater resilience as well as surface area for air cooling. Even should the holes $e'$, Fig. 17, partially close up under an initial compression of three eighths of an inch produced by the inflation of the tire, as shown in Fig. 18, they will still function as above described, because it will be realized that the said compression is relieved around a portion of the tread when the circular track is transformed into an ellipse under the load. That is to say, while the compression is greatest at the point of tread and a diametrically opposite point, which points are now terminals of the minor axis of the ellipse, the compression is gradually relieved toward the terminal points of the major axis, at which latter points there may be no compression at all so that the holes $e'$ open fully at these points.

By putting the alternate rubber and metal blocks under initial compression, stones, mud and other objectionable matters are prevented from entering between the blocks as all interstices are closed due to the tight contact between the metal and the rubber.

The ordinary pneumatic tire tends to take an elliptical shape, both in cross section and otherwise under the load, but owing to the stiffness of its cover and the restraint of the metal rim that holds it, the natural deflection of the walls of the tire to form the longitudinal elliptical curve of the wheel's circumference is restrained. In the ordinary tire whose cross section is designed to be circular, the air pressure within must also act against the wheel's circumference taking up an elliptical shape, whereas with the design described according to this invention of a cross sectioned outer cover of elliptical shape, the action of the compressed air within the tire at the sections relieved of restraint at the elongation of the major axis of the tread, on forming an ellipse, is to actually force the tire at this point from an elliptical cross section shape, into a circular one.

All the unharmonious restraint found in the tires at present on the market consumes energy, and generates heat.

Now these improvements further provide for the construction of the pneumatic tire in such a manner that its cross section is elliptical and not circular, as will be seen by reference to Fig. 2, and the tread parts are designed to fit this shape. In Fig. 2, of course, the tire is not under the greater initial compression referred to, namely, ⅜ an inch radial compression, as regards its entire circumference at one and the same time. The tire has however, the capacity of expanding radially ½ an inch in parts, on its tread assuming an elliptical shape, from the circular shape shown in Fig. 1. As the wheel takes the load or absorbs shocks there is room for further deflection of the pneumatic tire by deforming the latter still more elliptically.

When the wheel is under load the tire and tread lose the truly circular shape and become somewhat elliptical and the major axis of the ellipse may be 1¾ inches greater than the normal diameter of the wheel. To provide for this extension a free working clearance of ⅝ an inch is arranged between the inner periphery of the tread and the outer periphery of the rim $a$. When the tire and tread take the elliptical shape under load and the horizontal diameter of the circle is extended into the major axis of the ellipse it is possible for the lightly constructed pneumatic tire of elliptical cross section to expand to a circular cross section at points at the ends of the said major axis, so that at all points the space between the rim and the tread is properly occupied by the pneumatic tire.

Owing to the use of the tread, the thickness and stiffness of the pneumatic tire may be reduced to a working minimum and this, combined with the favorable shape given to the tire effects a pronounced diminution in the cross stresses and waste of energy hitherto experienced.

In cases where the pneumatic tire is made for a particular tread, the rubber blocks can be vulcanized on to the tire in position, thereby considerably simplifying the assemblage of the parts.

In consequence of the construction of the tread above described, the cover of the pneumatic tire can be made lighter for the same conditions of load, so that it is possible to have an appreciable gain in speed and ease of driving, due to the greater flexibility of the said cover. The depth of the tread does not interfere with its freedom to deform into the elliptical shape, and the energy consumed in compressing the rubber blocks is stored up by them for restitution. Vibrations of small amplitude and high frequency are absorbed by the tread blocks and the pneumatic tire, and vibrations of greater amplitude and less frequency are absorbed by the deformation of the tread blocks, as a whole and by the compression of the pneumatic tire over nearly ⅔ of its entire circumference. Also, the tangential pull on the tire, due to the drive, is distributed over the circumference of the pneumatic tire as also is the reaction of the road when the brake is applied.

The rubber voussoirs press against the pneumatic tire with suitable curved surfaces so that the road reaction is spread over a greater portion of the cross section of the tire. The curved surfaces also clench and strengthen the sides of the tire not only against vertical stresses but also against lateral stresses or forces normal to the plane of the wheel, such as those which are set up in turning corners, and so on. Owing to the distribution of the pressures over a greater area of the pneumatic tire as aforesaid, the vertical compression or flattening of the tire at the place of the contact of the tread with the ground is greatly reduced.

The improved action of the tire effects a reduction in the waste of energy usually apparent in the heating of the tire. In addition, the construction of the tire affords ample and increased air cooling surfaces so that the heat may be dissipated rapidly. On the authority of Professor Osborn Reynolds, there is a tendency to relative creeping motion between a tire and the road with a consequent expenditure of energy. With the improved tread, one revolution of the wheel should carry it forward by the distance around its circumference, so that in this respect there will be a saving of energy in addition to the saving of energy due to the reduced hysteresis in the material of the improved tread and to the reduction in the vertical compression or flattening.

The improved tread is particularly adapted for use by motor vehicles running over unmetaled roads, so that the latter can be immediately brought into service in a system of feeders and links, as for example, for Indian and other railways. If desired, however, the tread may be designed for attachment to an existing pneumatic tired wheel. In any case the invention is extremely simple to manufacture and quite fool-proof. The parts are not liable to get out of order and spare parts being light and handy may be easily carried and quickly placed in position. Lubrication of the parts is not necessary excepting, possibly, a graphite lubrication may be provided for the lips of the metal tread blocks where these are engaged by cable. Air spaces may be provided for cooling, between the tread and its inner resilient tire. By increasing the width of the rubber tread blocks or voussoirs, greater air spaces for cooling may be had and their resilience as well as their grip or clinging capacity is increased.

I claim:—

1. A tread for pneumatic tire comprising alternated rigid and compressible blocks, circumferential restraining means engaging said rigid blocks, said compressible blocks being adapted to rest against the periphery of said tire and said rigid blocks being adapted to engage adjacent compressible blocks, substantially as set forth.

2. A tread for pneumatic tire comprising alternated rigid and compressible blocks and circumferential restraining means engaging said rigid blocks, each of said compressible blocks being adapted for resting against the periphery of said tire and for wedging between neighboring rigid blocks.

3. A tread for pneumatic tire comprising alternated rigid and compressible blocks of wedge-like formation, said rigid blocks having their wide bases outwardly disposed and said compressible blocks having their wide bases inwardly disposed and resting against the pneumatic tire and circumferential restraining means engaging said rigid blocks.

4. A tread for pneumatic tire comprising alternated metal and rubber blocks disposed in contact with one another around said tire, said projections on side metal blocks, and circumferential flexible rings of relatively inextensible material engaged with said projections.

5. A tread for pneumatic tires comprising alternated metal and rubber blocks disposed in contact with one another around said tire, side projections on the metal blocks, and circumferential restraining means comprising two convolutions joined at their ends by loop portions, said restraining means being formed from an endless ring of flexible relatively inextensible material and having said convolutions engaged with said side projections and said loop portions engaged with said end projections.

6. A tread for pneumatic tire comprising an assemblage of blocks disposed around the periphery of a pneumatic tire, external side projections on said blocks, internal end projections on one of said blocks and two flexible convolutions joined at their ends by loop portions, the loop portions at said ends being engaged with said end projections and said rings being engaged with said side projections, substantially as set forth.

7. A tread for pneumatic tire comprising alternated metal and compressible blocks of wedge like formation, said compressible blocks having their wide bases inwardly disposed and resting against the pneumatic tire and said metal blocks having their wide bases outwardly disposed and each wedging between adjacent compressible blocks, side projections on said metal blocks, and flexible circumferential restraining means engaging said projections, said metal blocks being of hollow formation for permitting of air cooling, substantially as set forth.

8. A tread for pneumatic tire comprising hollow metal blocks of wedge-like formation alternated with compressible blocks of wedge-like formation and formed with transverse passages, said compressible blocks having their wide bases inwardly disposed and resting against the periphery of said tire and said metal blocks having their wide bases outwardly disposed and their sloping sides seating on the sloping sides of said compressible blocks, circumferential side projections on said metal blocks, and flexible restraining rings encircling said projections, substantially as set forth.

9. A tread for pneumatic tire comprising hollow metal blocks of wedge-like formation alternated with compressible blocks of wedge-like formation, said compressible blocks having their wide bases inwardly disposed and supported against said tire and said metal blocks having their wide bases outwardly disposed and perforated sloping sides seating against the sloping sides of said compressible blocks, circumferential side projections on said metal blocks, and flexible restraining rings encircling said projections, substantially as set forth.

10. A tread for pneumatic tire comprising a circular assemblage of metal tread blocks spaced apart circumferentially from one another and radially from said tire by rubber blocks alternated with said metal blocks, each of said rubber blocks being strutted against said tire and wedged between neighboring metal blocks, circumferential flexible restraining means for said metal blocks, and means on the latter for engaging said restraining means, substantially as set forth.

11. Wheel tire and tread comprising a pneumatic tire of elliptical cross section and having the major axis of said ellipse disposed transversely to the plane of said wheel, a circular assemblage of metal blocks encircling said tire, rubber blocks alternated with said metal blocks and strutted against said tire, said rubber blocks spacing said metal blocks apart circumferentially from one another and radially from said tire, circumferential flexible restraining means for said metal blocks, and means on the latter for engaging said restraining means, substantially as set forth.

12. A tread for pneumatic tire comprising a circular assemblage of metal blocks of wedge-like formation encircling said tire, rubber blocks alternated with said metal blocks and each strutted against said tire and wedged between neighboring metal blocks, said rubber blocks having sloping sides for engaging said metal blocks, and concave bases for engaging the convexity of said tire, circumferential restraining means for said metal blocks, and means on the latter for engaging said restraining means, substantially as set forth.

13. A tire tread block for pneumatic tire treads consisting of a hollow metal block with a tread face, perforated sloping transverse sides and longitudinal sides formed with projecting seatings adapted for the reception of a restraining cable, substantially as set forth.

14. A rubber block for pneumatic tire treads, said block being formed with two opposite flat sides and two opposite sloping ends and having a transverse aperture extending from one flat side to the other, and a base which is concave in transverse section, said base being adapted for butting against the convexity of a tire, substantially as set forth.

RICHARD RALPH à COURT BEADON.